US005772859A

United States Patent [19]

Guerini

[11] Patent Number: 5,772,859

[45] Date of Patent: Jun. 30, 1998

[54] DEVICE FOR TREATING WETTING LIQUID IN PRINTING PRESSES, PARTICULARLY FOR OFFSET PRINTING PRESSES

[76] Inventor: Arturo Guerini, Via A. De Gasperi 20, Castrezzato 25030, Italy

[21] Appl. No.: 545,656

[22] PCT Filed: Mar. 14, 1994

[86] PCT No.: PCT/EP94/00783

§ 371 Date: Oct. 31, 1995

§ 102(e) Date: Oct. 31, 1995

[87] PCT Pub. No.: WO95/03177

PCT Pub. Date: Feb. 2, 1995

[30] Foreign Application Priority Data

Jul. 21, 1993 [IT] Italy .............................. MI93A01622

[51] Int. Cl.[6] ............................... B41F 7/32; B41N 3/08; C02F 1/461

[52] U.S. Cl. .......................... 204/228; 204/242; 205/742

[58] Field of Search .................................... 205/742, 760, 205/761; 204/228, 242

[56] References Cited

U.S. PATENT DOCUMENTS 1,895,125 1/1933 Durham .
3,681,213 8/1972 Heit et al. .............................. 205/749
4,601,974 7/1986 Kita et al. .............................. 430/309
5,055,170 10/1991 Saito ...................................... 204/228
5,578,193 11/1996 Aoki et al. ............................. 205/746

FOREIGN PATENT DOCUMENTS 0 112 745 7/1984 European Pat. Off. .

*Primary Examiner*—Arun S. Phasge
*Attorney, Agent, or Firm*—Young & Thompson

[57] ABSTRACT

A method and device for treating the wetting liquid used to wash ink bearing portions of printing presses, particularly offset printing presses. The wetting liquid is based on water and has preset levels of acidity in electrical conductivity. The wetting liquid is subjected to electrolysis in a tank which may be separate from the water pan. Alternatively both the water pan and the ink bearing portion of the printing press may be electrically conductive, and connected to a DC power supply, so that both the washing and the electrolysis can be carried out in the electrically conductive water pan. The method increases the speed at which the ink dries in the printing phase and thereby enhances the efficiency of the printing press.

12 Claims, 2 Drawing Sheets

4a
5
6
7
+
–
3a
3a
1a
8
2a

DEVICE FOR TREATING WETTING LIQUID IN PRINTING PRESSES, PARTICULARLY FOR OFFSET PRINTING PRESSES

BACKGROUND OF THE INVENTION

The object of the present invention is a process and a device for treating the wetting liquid in printing presses, particularly for offset printing presses.

As we know, the efficiency of printing presses, especially offset printing presses, is related mainly to the speed at which the ink used for the printing dries.

The task of increasing the ink drying speed is thus a particularly acute problem in this area.

To carry out printing by the so-called "offset" method, the cylinder that holds the plate is inked by the inking cylinder and does the printing on a rubber cylinder which, in turn, transfers the printing to the sheet held by the printing cylinder.

The inking cylinder, in addition to being coated with ink, is "bathed" with a liquid that is usually composed simply of water, or a mixture of water and alcohol.

In the kind of printing that uses water as a wetting liquid, there-is the problem of low drying speed, which makes it impossible to reach high hourly production rates. In addition, the use of water causes smearing of the plate, resulting in poor-quality printing.

The kind of printing that uses water plus alcohol as a wetting liquid can achieve considerably better production rates in terms of both quality and quantity since alcohol, by reducing the surface tension of the water, makes it possible to distribute a finer layer of liquid and ink over the plate and thus ensures fewer smearing problems and a faster drying speed, facilitated by the volatility of the alcohol.

Along with these advantages, the use of water and alcohol as a wetting liquid poses some problems. As a matter of fact, the alcohol dilutes the ink, reducing the contrast effects in printing.

Moreover, an ink blurring effect that considerably degrades the quality of the printing is very commonly encountered.

Another problem is posed by the need for the machines with water-alcohol washing to have devices for cooling the alcohol in order to keep it from evaporating excessively.

An additional problem is the reduced tolerance of the personnel operating these machines for the alcohol vapors.

SUMMARY OF THE INVENTION

The primary task of the present invention is to solve the problems outlined above by devising a process and a device for treating printing-press wetting liquid that make it possible to eliminate the use of alcohol in the wetting liquid without impairing, and in fact directly increasing, the drying speed and thus the efficiency of these machines.

Within the framework of this task, one goal of the invention is to develop a process that makes it possible to achieve a printing quality that is better than that which can be obtained using water and alcohol as a wetting liquid.

Another goal of the invention is to propose a process that avoids the smearing problems which arise from using water alone as a wetting liquid.

A further goal of the invention is to propose a process that is simple to implement and that does not create problems of work environment contamination.

This task, as well as those and others that are presented in greater detail below, are accomplished by means of a process for treating the wetting liquid in printing presses, particularly offset printing presses, wherein said process consists of subjecting the wetting liquid, which is based on water and has preset levels of acidity and electrical conductivity, to electrolysis.

The process of the invention can be easily implemented using a device, wherein said device consists of a treatment tank, means of supplying this treatment tank with a wetting liquid that is based on water and has preset levels of acidity and electrical conductivity, and a direct-current [d.c.] electric power supply that is connected to an anode and a cathode that are immersed in the wetting liquid contained in this treatment tank for electrolysis of the wetting liquid placed in this treatment tank.

BRIEF DESCRIPTION OF THE DRAWINGS

Other characteristics and advantages of the invention are presented in greater detail in the description in the form of a preferred, but not exclusive, embodiment of the process, as well as of the device of the invention, which are illustrated as examples and without limiting their scope, in the attached drawings, where.

DESCRIPTION OF PREFERRED EMBODIMENTS

The process of the invention basically consists of using, as the wetting liquid, water that is desalinated and demineralized in advance by means of, e.g., a reverse-osmosis filtration process, and to this water are added acidity adjusting agents and electrical-conductivity adjusting agents in such a way as to bring the acidity and electrical conductivity of the wetting liquid to preset values. These preset values basically consist of a pH of between 4.5 and 5.5 and an electrical conductivity of between 800 $\mu$S and 2200 $\mu$S.

The acidity and electrical conductivity can be adjusted independently of one another by using, for example, an acidity adjusting agent such as $H_2SO_4$, or HF, or citric acid, and an electrical conductivity adjusting agent such as NaCl, or by using concentrated acid salts simultaneously.

The wetting liquid with this level of acidity and electrical conductivity value can then be subjected to electrolysis using a graphite anode, or a carbon anode, or a platinum-plated titanium mesh anode, and at least one steel cathode, preferably a stainless-steel one.

The power-supply voltage of the anode and the cathode are varied in inverse proportion to the conductivity of the wetting liquid and can vary essentially between 58 V and 38 V. In practice, with a wettingliquid conductivity equal to 800 $\mu$S, a voltage of 58 V is used, and this voltage is progressively reduced as the conductivity of the wetting liquid increases until it is brought to a value of 38 V, at which point the wetting liquid reaches an electrical conductivity equal to 2200 $\mu$S.

The wetting liquid is preferably recirculated in a closed circuit from an electrolytic treatment tank to the water pan mounted on the press, and vice versa.

Figure 1:
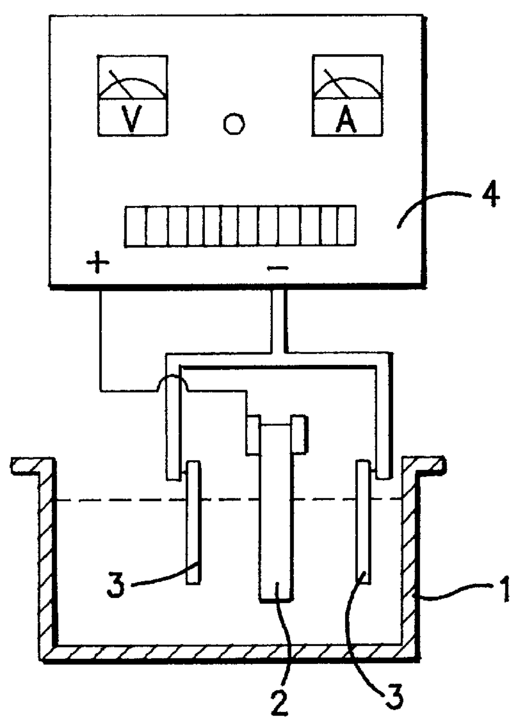
FIG. 1 it is a schematic of a device for carrying out the electrolysis of the process of the invention.

To implement the above-described process, a device is employed which can be readily composed, as shown in particular in FIG. 1, of a treatment tank 1, to which is sent the wetting liquid based on water with preset levels of acidity and electrical conductivity, as described above. In treatment tank 1 are immersed an anode 2, preferably made of graphite, and at least one cathode 3, which are connected to a d.c. power supply; this power supply can simply consist of a rectifier, of a known type, that is connected to the power grid.

Treatment tank 1 can be made of an electrically insulating material or steel and can itself act as the cathode in the electrolysis process that is carried out inside the treatment tank. In addition, this treatment tank can also be the printing press's own water pan.

Figure 2:
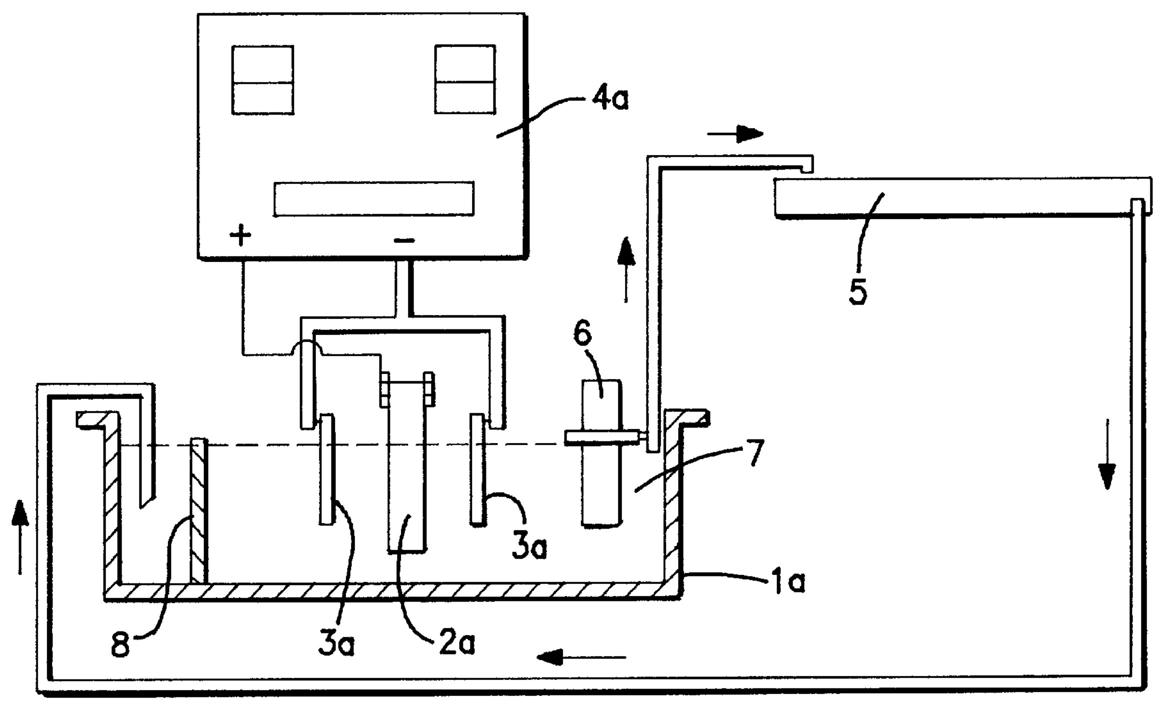
FIG. 2 shows a scheme for applying the device to implement the process of the invention to a printing press.

As FIG. 2 shows, the device for carrying out the process of the invention can consist of a treatment tank 1*a* that is distinct from water pan 5 which is mounted on the printing press and which is connected to the latter via a closed recirculation circuit with a pump 6 for pumping the wetting liquid through the circuit.

In this case as well, the device consists of a d.c. power supply 4*a* that is connected to an anode 2*a*, preferably made of graphite, and at least one cathode 3*a*, preferably made of stainless steel, which are immersed in the wetting liquid of treatment tank 1*a*. To keep any impurities from circulating, a weir 8 is placed inside the treatment tank.

Figure 3:
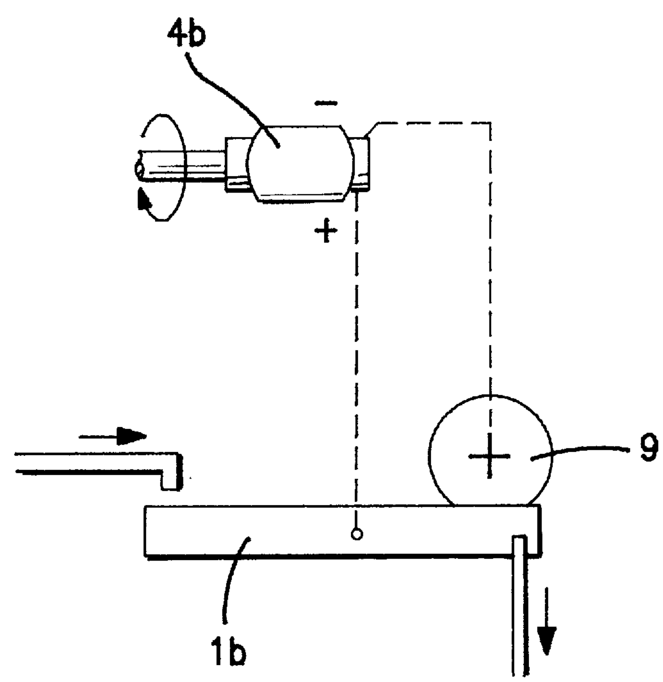
FIG. 3 shows another scheme for applying the device in which the electric power supply is composed of a d.c. generator with its poles attached to the treatment tank and to a pan roller.

As we know, in offset printing presses the essential parts include at least one pan roller, described above, which is colloquially referred to as a "bagnino" [pan roller] and which serves to wet the printing plate before the ink is applied to it. Since this wetting can be done with water or, better yet, with the aqueous solution for the treatment for which the process of the invention has been developed, the inventor has also devised a considerably simplified device that can be readily applied to existing machines. In such a simplified device (FIG. 3), the power supply consists of a d.c. generator 4*b* which is equipped with a potentiometer for regulation and whose shaft rotates as a single piece with one of the different rotating parts of the machine in which the device is used.

In this embodiment above-described treatment tank 1*b* serves, more simply, as the water pan for the printing press, into which above-mentioned wetter or "attendant" 9 extends, as usual; the latter should be made of a conductive material, e.g., preferably chrome-faced steel. The positive pole of the generator is connected to the above-mentioned water pan which, since it is also made of a conductive material, should be insulated with respect to the outside and thus acts as the anode, while the negative pole is connected to "attendant" roller 9, which serves as the cathode. It is thus possible to implement the process of the invention, with the same advantages as described-above, using a simpler and cheaper device.

The electrolysis that is applied to the wetting liquid with controlled levels of acidity and electrical conductivity causes an increase in the concentration of oxygen in the wetting liquid, which is identified as the factor that causes the ink, in the printing phase, to dry in considerably shorter times than are required for drying in traditional kinds of printing that use just water or water mixed with alcohol as wetting liquids. This phenomenon is based on the fact that the inks which are currently being used for printing, particularly for offset printing, have an elevated capacity for absorption and oxidation. Because of the electrolysis to which it is subjected, the heavily oxygen-enriched wetting liquid makes it possible for the ink to absorb large quantities of oxygen and thus causes it to oxidize faster and thus to dry more quickly.

In the case where sodium chloride is used as the agent for adjusting the electrical conductivity of the wetting liquid, another factor that accounts for the faster drying that is achieved with the wetting liquid that is treated with the process of the invention is the fact that, during the electrolysis process, sodium peroxides are formed which subsequently enhance the oxidizing effect of the wetting liquid on the ink.

In addition, since the plate that is used for offset printing is generally anodized, the wetting liquid, which is rich in ions due to the electrolysis process, adheres better to the plate, which makes it possible to have a constant and much thinner layer of liquid and ink on the plate, thus avoiding smearing problems.

It has been confirmed in practice that the process of the invention completely accomplishes the task at hand since it makes it possible to ensure considerably faster drying of the ink used for printing than can be achieved with the traditional use of water or water mixed with alcohol.

Another advantage lies in the fact that, with the process of the invention, the use of alcohol in the wetting liquid is eliminated, resulting in considerably better printing quality.

The elimination of alcohol from the wetting liquid also makes it possible to simplify the printing press since the devices for cooling the alcohol are no longer needed and hazardous substances are no longer released into the work environment.

As designed, the process, as well as the device for its implementation, can have many modifications- and variations, all within the scope of the inventive concept; in addition, all of the parts can be replaced with other parts that are technically equivalent.

I claim:

1. A device for treating a wetting liquid for an offset printing press, comprising:

a treatment tank (1, 1*a*, 1*b*) in an offset printing press, means for supplying said treatment tank with a water-based printing press wetting liquid, which has preset levels of acidity and electrical conductivity, and a d.c. power supply (4*a*) that is connected to an anode (2*a*) and a cathode (3*a*) in contact with the wetting liquid contained in said treatment tank for electrolysis thereof.

2. The device according to claim 1, wherein said anode (2*a*) comprises graphite.

3. The device according to claim 1, wherein said anode (2*a*) comprises carbon.

4. The device according to claim 1, wherein said anode (2*a*) comprises platinum-plated titanium mesh.

5. The device according to claim 1, wherein said cathode (3*a*) comprises steel.

6. The device according to claim 1, wherein said treatment tank (1*a*) comprises an electrically insulating material.

7. The device according to claim 1, wherein said treatment tank (1*a*) comprises steel and constitutes said cathode.

8. The device according to claim 1, wherein said d.c. power supply (4, 4*a*) comprises a rectifier powered from a power grid.

9. The device according to claim 1, wherein said treatment tank (1*b*) comprises a water pan of the printing press and wherein the power supply is a d.c. generator (4*b*), whose positive pole is connected to said water pan (1*b*) made of a conductive material and whose negative pole is connected to an attendant roller (9), which is made of a conductive material and extends into the wetting liquid contained in said water pan (1*b*).

10. The device according to claim 9, wherein said attendant roller (9) comprises chrome-plated steel.

11. A device for treating a wetting liquid for a printing press, comprising:

an electrically conductive water pan for holding a water-based printing press wetting liquid which has preset levels of acidity and electrical conductivity;

an electrically conductive attendant roller in said water pan for contacting the wetting liquid in said water pan; and a d.c. power supply having a first terminal connected to said water pan and a second terminal connected to said attendant roller, for electrolysis of the wetting liquid in the water pan.

12. A device for treating a wetting liquid for a printing press, comprising:

a treatment tank for the printing press having a water pan made of a conductive material;

means for supplying said water pan with a water-based printing press wetting liquid, which has preset levels of acidity and electrical conductivity; and a d.c. generator that is connected to an anode and a cathode in contact with the wetting liquid contained in said water pan for electrolysis thereof, wherein said generator's positive pole is connected to said wetting tank and negative pole is connected to an attendant roller that is made of a conductive material and extends into the wetting liquid contained in said water pan.

* * * * *